United States Patent [19]

Taniguchi et al.

[11] Patent Number: 4,764,822
[45] Date of Patent: Aug. 16, 1988

[54] METHOD FOR RECORDING CUE SIGNAL

[75] Inventors: Hiroshi Taniguchi, Hirakata; Mitsunobu Furumoto, Yao; Kanji Kubo, Hirakata, all of Japan

[73] Assignee: Matsushita Electric Industrial Co., Ltd., Kadoma, Japan

[21] Appl. No.: 842,174

[22] Filed: Mar. 21, 1986

[51] Int. Cl.$^4$ ..................... G11B 5/09; G11B 15/18
[52] U.S. Cl. ............................. 360/48; 360/722
[58] Field of Search .............. 360/27, 28, 32, 48, 360/72.2

[56] References Cited

U.S. PATENT DOCUMENTS 4,542,419  9/1985  Morio et al. ..................... 360/32
4,544,966  10/1985 Taniguchi et al. ............... 360/27
4,646,171  2/1987  Odaka et al. ..................... 360/32

Primary Examiner—Vincent P. Canney
Attorney, Agent, or Firm—Cushman, Darby & Cushman

[57] ABSTRACT

The present invention relates to a cue signal recording method in which multi-audio tracks are formed by dividing a magnetic tape in a widthwise direction, and PCM data is recorded in a scanning track segment of an audio track of the multi-audio tracks by a helically scanning rotary head. A cue signal is then recorded in a remaining area of the scanning track segment except for the area recorded with the PCM data, such as in the after-recording-margin area or the track-guard area which is immediately after the PCM data area.

2 Claims, 8 Drawing Sheets

| | Contents | Angle |
|---|---|---|
| a | Clock-run-in | 2° (min) |
| b | PCM data-area | 26.3° |
| c | After-rec-margin | 2° |
| d | Video-overlap | 2.7° |
| e | Video area | 180°+ 5° |
| ℓ | P.C.M area | 33.3° |

METHOD FOR RECORDING CUE SIGNAL

BACKGROUND OF THE INVENTION

1. Field of the Invention

The present invention relates generally to a method for recording a cue signal per se or a cue signal including an address signal, and particularly concerns the recording of a cue signal for each audio track of a recording, for instance, in a PCM audio signal recording recorded in multi-audio tracks formed by dividing a magnetic tape in a widthwise direction.

2. Description of the Related Art

In the prior art, there is a known recording method wherein cue signals for electronics editing are recorded by using a well known cue track which is provided lengthwise on the tape of a video tape recorder. However, in this system for providing the cue track lengthwise on the tape, since the method is intended to be applied to a multi-audio track recording system wherein PCM audio signals are recorded in multi-audio tracks which are formed widthwise by dividing the magnetic tape, it is necessary to provide a plural number of cue tracks, and thereby the efficiency of utilization of the magnetic tape is decreased. Accordingly, an efficient method of recording a cue signal which is to be recorded by rotary heads has been demanded.

OBJECT AND SUMMARY OF THE INVENTION

The purpose of the present invention is to provide an efficient method for recording a cue signal by rotary head(s) on a magnetic tape which is wound helically around a cylindrical body having rotary head(s) on its surface, thereby making a helical scanning track which is oblique to the lengthwise direction of the magnetic tape, wherein the magnetic tape is widthwise divided into plural areas to thereby make "n" multi-audio tracks such that information such as PCM autio signals may be recorded on respective audio tracks. The method for recording a cue signal in accordance with the present invention is characterized by recording the cue signals using the rotary heads in the above-mentioned system, wherein the cue signal is recorded at the part after the ending of the recording data area of a scanning track segment in respective audio tracks of the n multi-audio tracks.

According to the above-mentioned method of the present invention, the cue signals can be recorded in superposition on the regions of the postamble signal and on track guard regions. As is known, the postamble signal region and the track guard region are recorded immediately after the ending of the data signal area of a scanning track segment in respective audio tracks of the multi-audio tracks. Therefore, the postamble signal regions which are not required during reproduction of the recorded signal can be effectively utilized as the cue signal regions. The cue signals can be recorded corresponding to respective audio tracks of the multi-audio tracks, and hence, provision of the cue track corresponding to respective audio tracks as in the prior art method becomes no longer necessary. In other words, the magnetic tape utility efficiency is improved, since there is no need for providing the cue tracks for every audio track. Furthermore, there is no need to provide a particular recording head of a fixed type for recording the cue signals, since according to the present invention the cue signals can be recorded and reproduced by utilizing the rotary heads for the PCM signal recording and producing. Also, according to the present invention the cue signal can be recorded on an area except other than the PCM data-recorded area on arbitrary lengthwise positions of the magnetic tape on respective audio tracks when the PCM audio signal is recorded in the multi-audio tracks. Therefore, the cue signals can be arbitrarily recorded without undesirably influencing the already recorded PCM data on the magnetic tape.

These and other various technical advantages and merits will be clarified in the subsequent detailed description of the preferred embodiment.

The cue signals to be recorded by the rotary head are preferably pilot signals of low frequency, since the position of the cue signal can be easily reproduced by using the pilot signals of such low frequency even when the tape is driven at high speed. However, it is necessary to record the cue signals for a plurality of scanning segments of each audio track of the multi-audio tracks in order to enable reproduction of the position of the cue signal even for the high speed search. Usually it is enough to record the cue signal for a one second period.

According to the present invention, the following effects are obtainable:

(1) Cue signals can be arbitrarily recorded without undesirably influencing the already recorded tape, since the cue signals can be recorded at any desired positions lengthwise on the recording tape for respective tracks in PCM audio signal recordings on multi-tracks.

(2) There is no need for providing a particular fixed head for cue signal recording, since the cue signals can be recorded by using the rotary heads used for PCM signal recording and reproducing.

(3) Tape utility efficiency is improved, since there is no need for providing particular cue tracks for respective audio signal tracks.

These and other various technical advantages and merits will be clarified in the subsequent detailed description of the preferred embodiment.

DESCRIPTION OF THE PREFERRED EMBODIMENT

Figure 1:
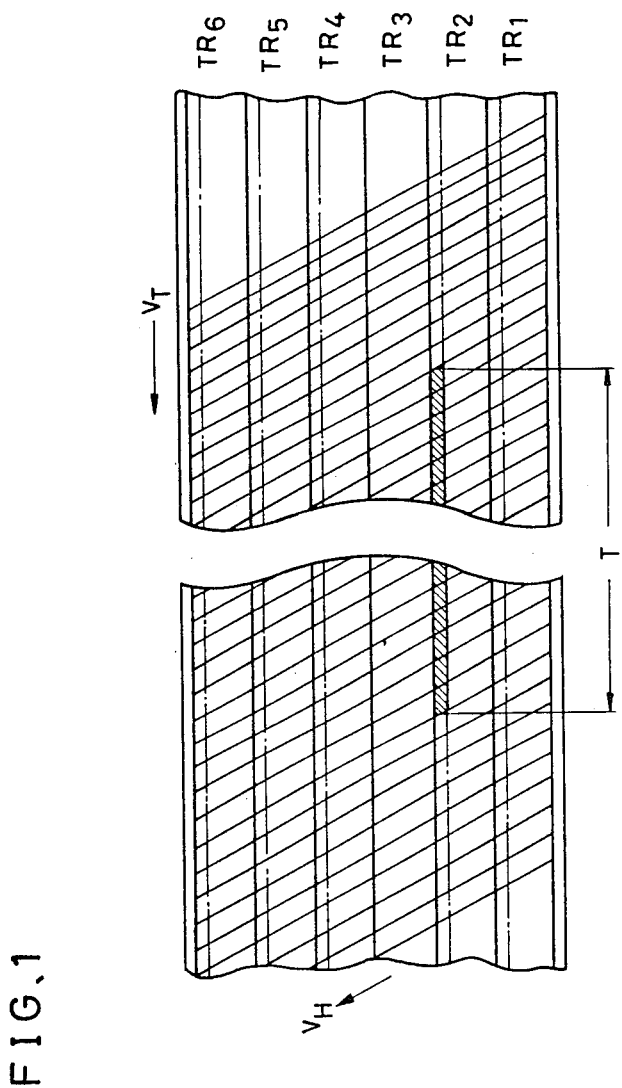
FIG. 1 is a plan view showing a part of a recording tape wherein scanning track segments recorded with cue signals are shown.
Figure 5:
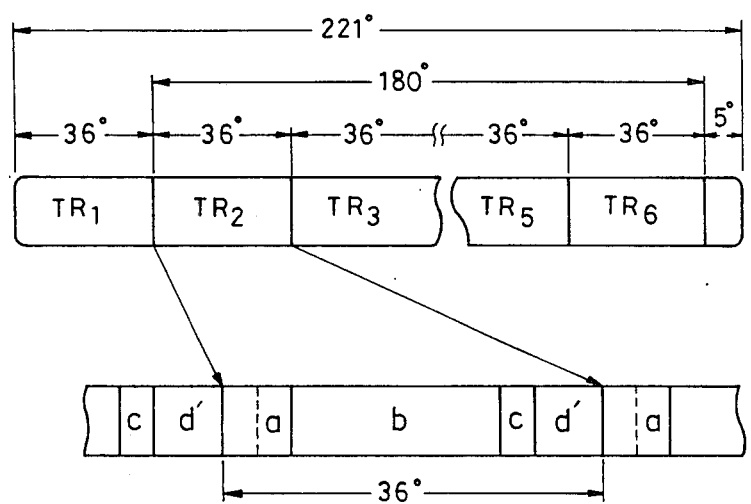
FIG. 5 is a plan view of the tape illustrating one example of the recording format of the tape when the 8 mm VTR system is utilized as the multi-audio track PCM audio recording system.

FIG. 1 is a plan view schematically showing the recording pattern of cue signals for a time length T in a PCM track $TR_2$, wherein cue signals are recorded in the region shown by a hatched region "c" or "d'" of the second track $TR_2$ as shown in FIG. 5.

Figure 2A:
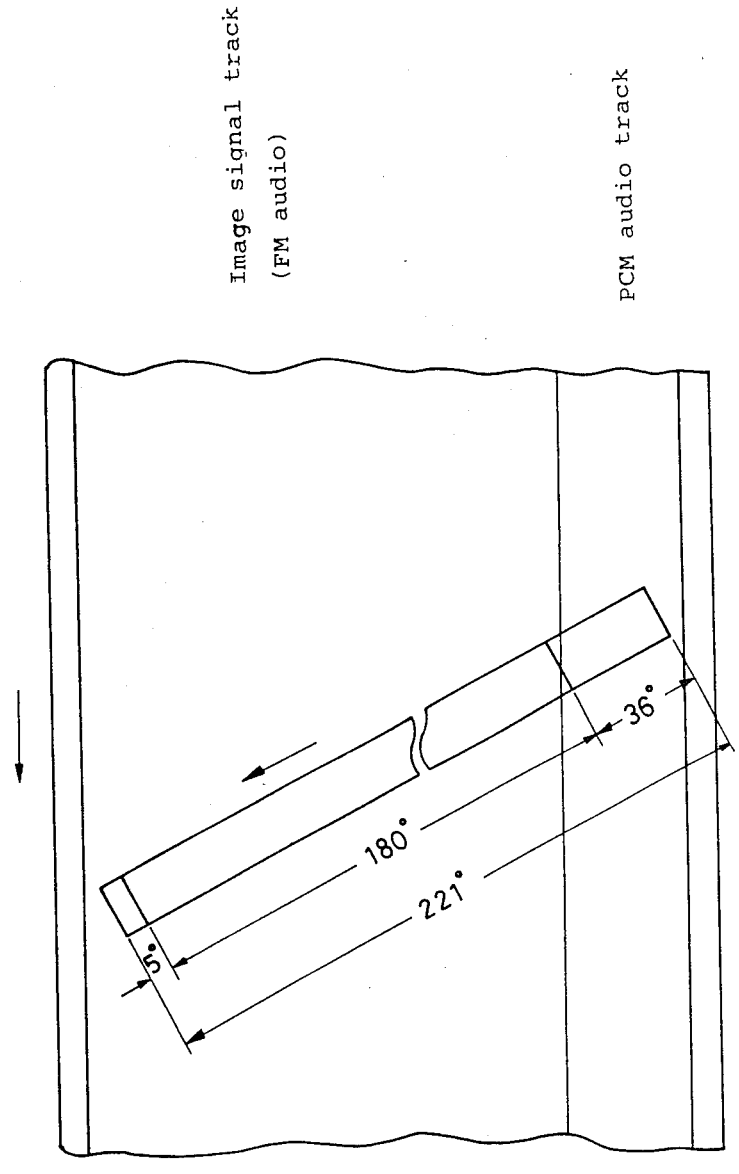
FIG. 2(A) is a plan view showing a standard tape recording format A in an 8 mm VTR system.
Figure 2:
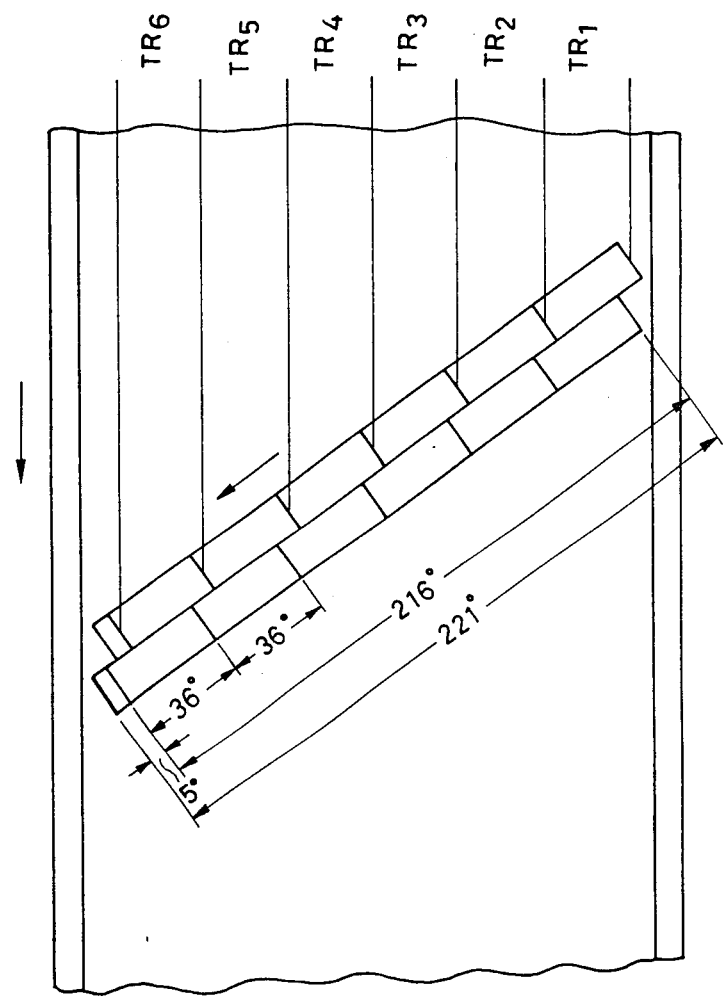
FIG. 2(B) is a plan view showing a tape recording format B when the 8 mm VTR is utilized as a multi-audio track PCM system.

FIG. 2(A) shows, in a more detailed manner, the recording format A on the tape of an 8 mm VTR system, and FIG. 2(B) shows another recording format B which is used when multi-audio track PCM audio signal recording is performed by utilizing an 8 mm VTR deck without a recording image signal.

As shown in FIG. 2(A), in the 8 mm VTR, the magnetic tape is wound around the rotary head cylinder by about 221°, and the time-compressed PCM audio signal is recorded at the part of the angle of about 36° of the lower part of the tape, whereas the image signal and the FM audio signal are recorded at the part of the angle of $180° + \alpha°$ of the remaining upper part of the magnetic tape. A low frequency pilot signal, used as a tracking signal for reproducing the recorded signal safely on the recorded track by a reproducing head, is recorded in superposition on the image signal and the PCM audio signal. (The pilot signal has no connection with the subject matter of the present invention, and therefore the detail of the pilot signal is omitted.) Also, the cue signal track area and the linear audio signal track area are formed as an auxiliary track (AUX track) at the upper and lower edges of the magnetic tape.

Figure 3:
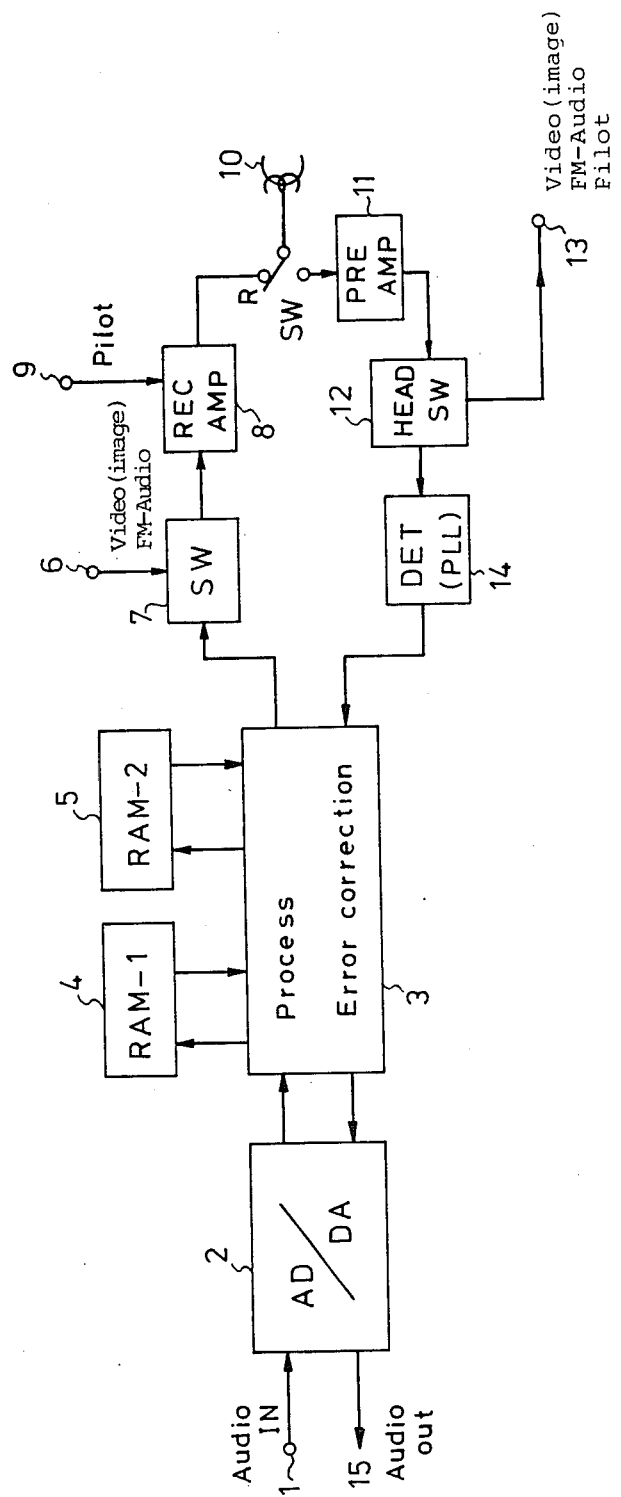
FIG. 3 is a circuit block diagram schematically illustrating PCM audio signal recording in the 8 mm VTR system.

Then, in the 8 mm VTR system having such a recording format as shown in FIG. 2(A), by diverting the above 8 mm VTR tape to the 8 mm VTR system to record the PCM audio signal without an image signal, the time compressed PCM audio signal in the 36° region can be recorded on the magnetic tape, thereby forming six audio tracks in total as shown by the recording format in FIG. 2(B). In the 8 mm VTR system having a PCM audio recording and reproducing circuit, the 8 mm VTR system can be changed easily to the 8 mm VTR tape for recording and reproducing the PCM audio signal having the multi-audio tracks as shown in FIG. 2(B), by only switching a recording position on the tape containing the PCM audio signal. Thus, the main object of the present invention is to offer such means that the cue signal can be inserted into respective audio tracks when the PCM audio signal recording for the multi-audio tracks is executed. Before describing the cue signal inserting method of the present invention, however, the outlines of the PCM audio signal recording of the 8 mm VTR system will be described as follows:

FIG. 3 is a circuit block diagram for describing the outline of PCM audio signal recording to the 8 mm VTR system. In FIG. 3, the audio signal supplied from a terminal 1 is converted into a digital signal of 10 bits by an A/D converter 2, and is further compressed to 8 bits. The audio signal converted into a digital signal is then supplied to a signal processing circuit 3 where it is added to an error correction code and further is memorized temporarily in random access memories (RAM) 4 and 5 alternatively, for instance, every 1/60 second. The data memorized in the random access memories 4 and 5 are then read out alternatively in the corresponding high speed, and the read out data is modulated adequately for a VTR recording and further are applied to a switching circuit 7. The PCM audio signal and a signal made by mixing an image signal and FM audio signal are supplied from a terminal 6 and combined in the switching circuit 7. The combined signal is then mixed with the pilot signal supplied from a terminal 9 in a recording amplifier 8 and is recorded on the magnetic tape by a magnetic head 10 through a recording and reproducing change-over switch SW.

During reproduction, a signal reproduced by the magnetic head 10 is supplied to a head switch circuit 12 through a pre-amplifier 11. From the output of the head switch circuit 12, the image signal, the FM audio signal and the pilot signal are derived and outputted to a terminal 13. Also, the output of the head switch circuit 12 is supplied to a demodulation circuit 14 of a PCM signal and is demodulated therein into the original PCM audio signal. The output signal of the demodulation circuit 14 is then supplied to the signal processing circuit 3 where the error correction is executed. Then, the output signal is memorized alternatively in the random access memories 4 and 5. The memorized data in the random access memories 4 and 5 are read out by using a reference clock and are supplied to the D/A converter 2. Thus, the demodulated and reproduced audio signal is obtained at a terminal 15.

The A/D, D/A converter 2 operates as an A/D converter and a D/A converter responding to a recording process and a reproducing process, respectively. The signal processing circuit 3 is also switched in response to the recording process and the reproducing process. Further, in an actual 8 mm VTR, the audio signal to be supplied to the A/D converter 2 is supplied to a level compression circuit, and the output signal of the D/A converter 2 is supplied to a level expander circuit as is well known. However, the level compression circuit and the level expander circuit are omitted here.

As is apparent from the above, the audio signal can be recorded in a format such as the FIG. 2(A) formaton the magnetic tape using the above-mentioned circuit of FIG. 3. A position wherein the signal is recorded on the magnetic tape is determined on the basis of a pulse indicating a rotation phase of the rotary head. Therefore, the PCM audio signals can be recorded as shown in such FIG. 2(B) in a manner that the recording position is shifted sequentially by recording only the PCM audio signal and no image signal or FM audio signal and by shifting the phase of the above pulse by 36° for each recording position.

Figure 4:
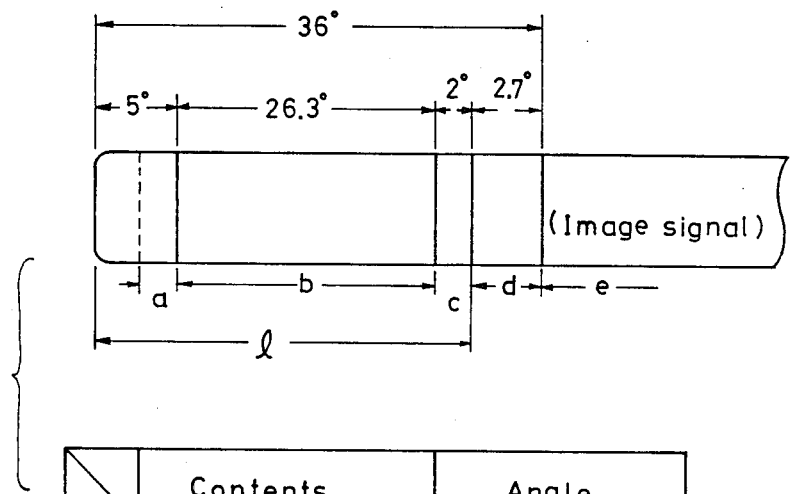
FIG. 4 is a plan view showing a detailed illustration of PCM audio signal recording regions in the 8 mm VTR system.

Now, the format of the PCM audio signal recording on the magnetic tape in the 8 mm VTR system will be described in detail with reference to FIG. 4. In FIG. 4, an indication (a) indicates a clock-run-in of an angle 2° or more. An indication (b) indicates a data area of an angle of 26.3°. An indication (c) indicates an after-recording-margin of an angle 2° (in this area, usually the postamble carrier is recorded). An indication (d) designates a video-overlapping-area of an angle of about 2.7°. Actually, however, the clock-run-in area (a) has 5° and the area for the PCM audio signal is about 33.3° (1).

Next, the recording area on the magnetic tape for the multi-audio tracks for PCM recording will be described. FIG. 5 shows the recording area on the magnetic tape when the multi-audio track PCM recording is executed by assigning angles of 36° for respective audio tracks. In FIG. 5, each audio track occupies an angle of 36° and a margin of an angle of 5° after the audio track $TR_6$. An enlarged pattern for each audio track is shown in a lower portion of FIG. 5. The lower figure is almost like FIG. 4 except that the part (d) (video overlapping part) in FIG. 4 is used as a track guard (d'), namely, a non-recording part in FIG. 5.

In the present invention, the cue signals corresponding to respective audio tracks are recorded in the area (c) and/or the area (d') of FIG. 5 for the multi-audio track PCM audio signal recorded as mentioned above. Stable reproducing can be obtained as described later when a low frequency signal (for instance, about 200 KHz) is used as the cue signal. The area (c) of FIG. 4 and FIG. 5 is referred to as the after-recording margin, and it is originally unnecessary to record a signal in the area (c) so that the area (c) is an unnecessary part for reproducing.

The area (c) is formed for the following reason. When a new PCM signal is overlapped by over-writing on a PCM signal already recorded, and the new recorded signal region is made in a deviated position from the old recorded signal region, and therefore a part of the old PCM signal remains, the remaining old PCM signal is reproduced in error when the new PCM signal is reproduced, thereby producing noise. Therefore, the clock (postamble) of 5.8 MHz is recorded in the area (c), and when the after-recording is when executed, that is, the new signal is overlapped on the old signal, the old signal is cancelled by using the postamble. Therefore, even when the cue signal is recorded in the area (c), the reproduced signal has no error.

Accordingly, the cue signal can be recorded in a part of or a whole of the area (c) and/or the area (d'). In an extreme case, the cue signal can be recorded in such an area as the top part of the next neighboring scanning track segment, so long as the cue signal does not invade the clock-run-in area (a) of the next neighboring scanning track segment. In such a case the clock-run-in area (a) may become the minimum value (2°).

The longer the recording area of the cue signal, the more stable the detection of the cue signal becomes. The detection is executed precisely when the cue signal area length is about 1H horizontal scanning period of the television signal and the 1H horizontal scanning period corresponds an angle of about 0.7°. The sum of the areas (c) and (d') is an angle of 4.7°, and therefore, it is not difficult according to a physical aspect and a precision aspect to record the cue signal of 0.7° in the areas (c) and (d') of 4.7°.

As a method to determine precisely the position of the cue signal recording, the PCM audio signal can be reproduced and an ending point of the PCM data area (b) may be detected precisely by an address signal detected from the reproduced PCM data. Also, the recording position of the cue signal may be determined on the basis of the detected ending point of the PCM data area (b).

Figure 6:
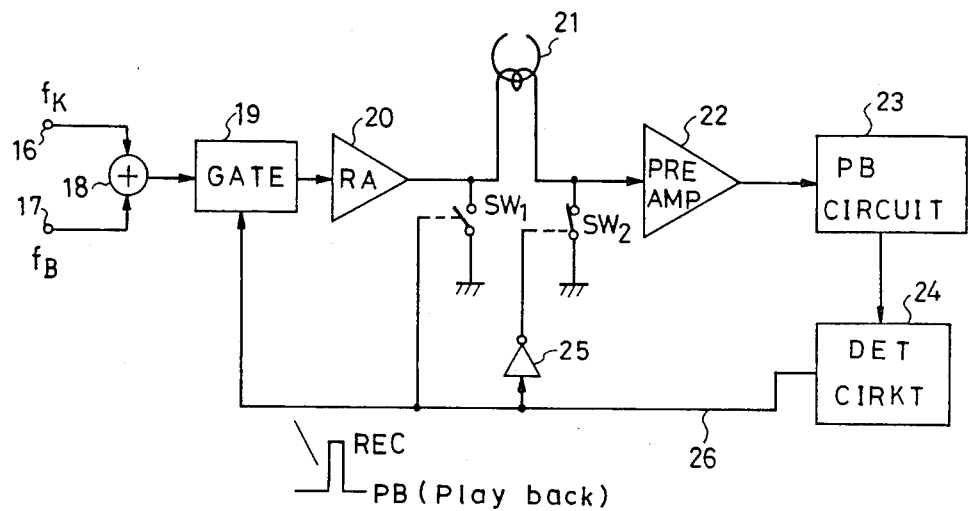
FIG. 6(A) is a block diagram of a cue signal recording circuit.
FIG. 6(B) is a waveform chart of a gate pulse signal of the cue signal recording circuit of FIG. 6(A).
Figure 6:
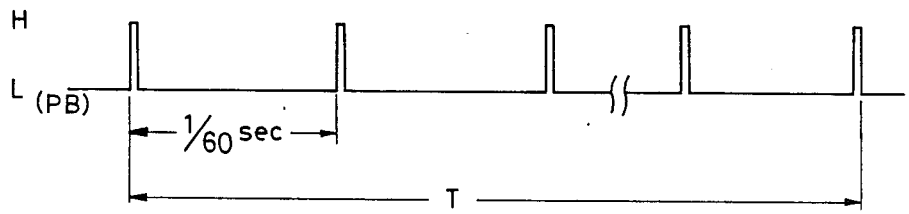

FIG. 6(A) shows a block diagram of an embodiment of the cue signal recording circuit. FIG. 6(B) shows a wave chart for describing the above cue signal recording circuit of FIG. 6(A). In FIG. 6(A), the low frequency signal $f_K$ for the cue signal is supplied from a terminal 16, and a bias signal $f_B$ for an AC bias recording is supplied from a terminal 17. Both the signals are summed together by an adder 18 and supplied to a gate circuit 19.

A low frequency component of about 200 KHz to 500 KHz, which can be descriminated clearly from the pilot signal for a tracking operation (100 KHz to 160 KHz), is preferably used as the cue signal $f_K$. As the cue signal, the $f_S$ signal of about 230 KHz, which is normalized in the 8 mm VTR as a signal for arranging the height of the rotary head, can also be used. The bias signal $f_B$ is preferably added for bias-recording of the cue signal. It is convenient to use a clock signal 5.8 MHz for the PCM signal as the signal $f_B$.

The gate circuit 19 opens only when a pulse for a cue signal recording position supplied from a signal line 26 is high, thereby supplying the added signal to a recording amplifier 20. Then, the cue signal is recorded through a magnetic head 21. Switches $SW_1$, $SW_2$ are driven in synchronism with the gate pulse. That is, when the gate pulse is high, the switch $SW_1$ is OFF and the switch $SW_2$ is ON, thereby making the magnetic head 21 be in a recording mode so that the cue signal is recorded. Further, when the gate pulse is low, the switch $SW_1$ becomes ON and the switch $SW_2$ becomes OFF so that the magnetic head 21 enters the reproducing mode. The reproduced signal is amplified by a pre-amplifier 22 and is supplied to a reproducing signal processing circuit 23. A predetermined address signal in the PCM data obtained by the reproducing signal processing circuit 23 is supplied to a detecting circuit 24. The ending point of the PCM data area is detected on the basis of the produced predetermined address signal by the detecting circuit 24. The gate pulse for determining the cue signal recording position is then issued to the signal line 26 on the basis of the detected ending point. Also, when an error is produced in the predetermined address data, the gate pulse is not produced and the address can be skipped.

FIG. 6A discloses that the gate pulse is detected from the resproduced PCM data, but the gate pulse can also be obtained in a manner so as to be produced on the basis of a pulse which is phase-shifted by a predetermined amount of phase from a PG signal indicating the rotation phase of the rotary head. Further, in FIG. 6A, the cue signal is bias-recorded with $f_B$ as an AC bias, but the cue signal can be recorded without the bias signal.

In the above-mentioned embodiment, a signal of 200 KHz–500 KHz is recorded as the cue signal but, for instance, the 2.9 MHz signal corresponding to the PCM data "0" can be recorded. Here, the cue signal is considered to be detected when a predetermined number of the "0" data are detected sequentially. Thus, the cue signal can be detected digitally.

Now, elucidation is made on an adequate period for recording the cue signal in the lengthwise direction of the magnetic tape.

The cue signal should be recorded for a certain period in the lengthwise direction of the magnetic tape since the cue signal is preferably detected when the magnetic tape is driven at a search speed or is driven backwards. In the 8 mm VTR which records essentially the NTSC type television signal, for example, the scanning track segments of each track of the multi-audio tracks are recorded intermittently every 1/60 second for each segment. Therefore, the cue signal can be detected only once every 1/60 second even when the VTR tape is reproduced with the same speed as that of the recording. Therefore, when the magnetic tape is driven at a high speed or is driven backwards at a speed of, for example, 30 times as large as that of the recording, the cue signal cannot be detected if less than 30 cue signals are recorded in the lengthwise direction of the magnetic tape. Therefore, 60 or more cue signals are preferably recorded from the safety point of view. The recording period T of the cue signal in FIG. 6(B) thus becomes one second for recording the 60 cue signals. At least 0.5 second is necessary for the recording period T in this case, and two seconds are enough (T having larger periods than two seconds can be used.)

FIG. 1 shows the recording pattern in which the cue signal is recorded for the period T in the audio track $TR_2$ of the PCM audio track. The cue signal is recorded in the hatched part which is indicated by "c" or "d'" of the audio track $TR_2$ in FIG. 5. FIG. 1 shows that the cue signal is recorded only on the audio track $TR_2$, but the cue signals may be recorded at an arbitrary position on each audio track $TR_1$-$TR_6$. There is no problem for detecting the cue signal even when the recorded cue signals of respective audio tracks have the same positions in a widthwise direction. Further, if circumstances require, it is not always necessary to make the length of T more than 0.5 second, and only one cue signal can be used, that is, the T can be 1/60 second. But in this case, the magnetic tape should be driven during reproduction with the same speed as that of the recording or with a lower speed. Such recording using only one cue signal is useful when the cue signal is used at the above-mentioned tape speed.

In the above-mentioned embodiment, the multi-audio track PCM audio signal is recorded on a straight line of the rotary head recording locus as shown in FIG. 1. However, it is unnecessary to make the PCM audio signal form a straight line, for the scanning track segments of one audio track can be shifted with respect to the scanning track segments of other audio tracks. Generally, the PCM audio signal is recorded in each audio track, and therefore the scanning track segments of the PCM audio signals of the respective audio tracks are random with respect to each other as shown in FIG. 7.

Figure 7:
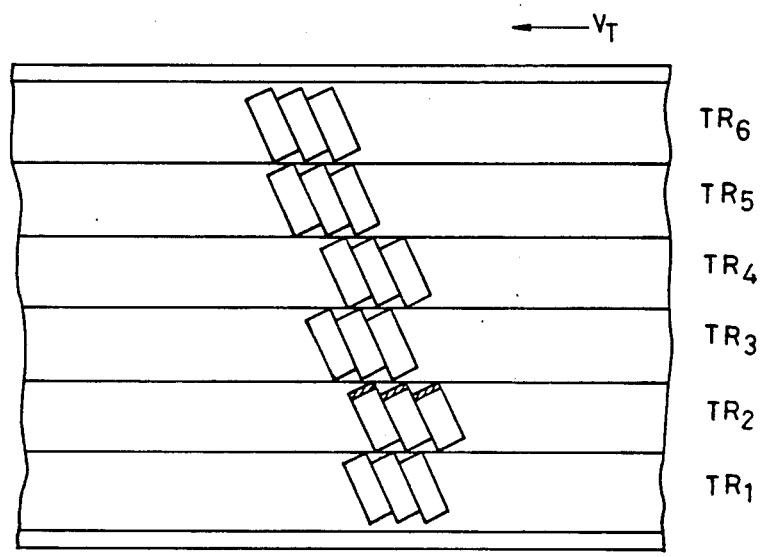
FIG. 7 is a plan view schematically showing the recording track pattern when the PCM audio signals are recorded one audio track by one audio track.

The PCM audio signal shown in FIG. 7 is reproduced as follows. The tracking of the reproduction is executed by using a tracking pilot signal recorded with superposition on the PCM audio signal. The above-mentioned track segment shift between the audio tracks is then detected by the reproduced tracking pilot signal obtained in each audio track. The tracking is executed precisely for each audio track by sampling and holding the detected tracking error signal using the reproduced pilot signal.

In FIG. 7, the cue signal indicated by the oblique line is recorded in the areas (c) and (d') in the audio track $TR_2$.

The cue signal recording method for the multi-audio track audio signal is disclosed in the above description. However, when both the PCM audio signal and the image signal are recorded as shown in FIG. 2(A), the cue signal can also be recorded in the after-recording-margin of the area (c) in FIG. 4. Therefore, in this case, the cue signal can be recorded and reproduced by the rotary head without providing a particular cue track at the edge of the magnetic tape.

When a cue signal of 200 KHz–500 KHz is used, the reproduction of the cue signal is executed stably by detecting the reproduction of the $f_K$ at the predetermined position of the rotary phase of the rotary head on the predetermined audio track using bandpass filter having the cue signal frequency $f_K$ as a central frequency. On the other hand, when the PCM data "0" is used as the cue signal, the cue signal is considered to be detected when a predetermined number of, for instance, 50 of the "0" information bits are detected digitally in sequence by the reproducing clock produced by the PLL (phase-locked loop). Further, the cue signal including the address data can also be recorded and reproduced when the cue signal is recorded digitally.

When the cue signal is recorded for the period T in FIG. 1 and the magnetic tape should be stopped at a precise position, the magnetic tape can be stopped at such position which is delayed for an arbitrary period from the beginning of the cue signal, by detecting, for instance, the beginning of the cue signal.

What is claimed is:

1. A method for recording a cue signal, comprising the steps of:
    recording a time-compressed PCM audio signal on multi-audio tracks, said tracks being formed by dividing a magnetic tape in a widthwise direction, using a rotary head rotating along a helical scanning path; and
    recording cue signals on a desired audio track of said multi-audio tracks at a desired lengthwise position of the recorded magnetic tape, said cue signals being recorded in at least one of an after-recording-margin area and a track-guard area which is immediately after a PCM data area, a recording timing of said cue signal being produced on the basis of a detection pulse which is phase-shifted by a predetermined phase amount from a signal indicating the rotation phase of the rotary head.

2. A method for recording a cue signal, comprising the steps of:
    recording a time-compressed PCM audio signal on multi-audio tracks, said tracks being formed by dividing a magnetic tape in a widthwise direction, using a rotary head rotating along a helical scanning path; and
    recording cue signals on a desired audio track of said multi-audio tracks at a desired lengthwise position of the recorded magnetic tape, said cue signals being recorded in at least one of an after-recording-margin area and a track-guard area which is immediately after a PCM data area, a recording timing of said cue signal being produced on the basis of a detection pulse of an ending position of a reproduced PCM data area using predetermined reproduced PCM address data.

* * * * *